United States Patent
Della Pietra et al.

[11] Patent Number: 5,987,404
[45] Date of Patent: *Nov. 16, 1999

[54] STATISTICAL NATURAL LANGUAGE UNDERSTANDING USING HIDDEN CLUMPINGS

[75] Inventors: Stephen Andrew Della Pietra, Smithtown; Mark Edward Epstein, Katonah; Martin Franz, White Plains, all of N.Y.; Joshua David Sherer Koppelman, Austin, Tex.; Salim Estephan Roukos, Scarsdale; Robert Todd Ward, Croton-on-Hudson, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/593,032
[22] Filed: Jan. 29, 1996
[51] Int. Cl.⁶ .................................................... G06F 17/28
[52] U.S. Cl. ...................................... 704/9; 704/2
[58] Field of Search ........................... 704/1, 8, 9, 257, 704/277

[56] References Cited

U.S. PATENT DOCUMENTS

| | | | |
|---|---|---|---|
| 4,829,423 | 5/1989 | Tennant et al. | 364/200 |
| 4,829,580 | 5/1989 | Church | 381/52 |
| 4,914,590 | 4/1990 | Loatman et al. | 364/419 |
| 5,029,085 | 7/1991 | Ito | 364/419 |
| 5,109,509 | 4/1992 | Katayama et al. | 395/600 |
| 5,293,584 | 3/1994 | Brown et al. | 704/577 |
| 5,369,574 | 11/1994 | Masegi et al. | 704/9 |
| 5,680,511 | 10/1997 | Baker et al. | 704/557 |

OTHER PUBLICATIONS

C. Y. Suen, "n–Gram Statistics for Natural Language Understand and Text Processing", IEEE Trans. on Pattern Analysis and Machine Intelligence, v.PAMI–1 #2 Apr. 1979, pp. 164–172.

R. Kuhn & R.De Mori, "The Application of Semantic Classification Trees to Natural Language Understanding", IEEE Trans. on Pattern Analysis and Machine Intelligence, v.17 #5 May 1995, pp. 449–460.

R. Pieraccini et al "A Speech Understanding System Based on Statistical Representation of Semantics", IEEE Conf. Proc. of IEEE–ICASSP VI–193–196, Mar. 1992.

S. Miller et al., "Hidden Understanding Models of Natural Language", Proc. of 32nd Annual Mtg. of ACL, Jun. 1994, pp. 25–32, Morgan Kaufmann Publishers, Inc.

R. Pieraccini et al, "Stochastic Representation of Sematic Structure For Speech Understanding" Eurospeech Communication Assn., v.2, Sept. 1991, 383–386.

*Primary Examiner*—Forester W. Isen
*Assistant Examiner*—Patrick N. Edouard
*Attorney, Agent, or Firm*—F. Chau & Associates, LLP

[57] ABSTRACT

The invention proposes using statistical methods to do natural language understanding. The key notion is that there are "strings" of words in the natural language, that correspond to a single semantic concept. One can then define an alignment between an entire semantic meaning (consisting of a set of semantic concepts), and the English. This is modeled using P(E,A|S). One can model p(S) separately. This allows each parameter to be modeled using many different statistical models.

12 Claims, 2 Drawing Sheets

STATISTICAL NATURAL LANGUAGE UNDERSTANDING USING HIDDEN CLUMPINGS

FIELD OF THE INVENTION

The invention relates to natural language understanding and processing.

BACKGROUND OF THE INVENTION

Most current natural language understanding and processing systems use linguistic methods for the understanding of input sentences. The problem with linguistic models is that there has yet been no portable linguistic approach that can provide natural language translation at a satisfiable level of accuracy. The reason for this poor accuracy is that linguistic approaches require domain experts to customize the grammars and actions, and hence can take years to develop.

Statistically-based natural language understanding ("NLU") has recently been attempted, but no commercially viable systems have yet been made available. There are natural language ("NL") interfaces to databases, but their success has been limited due to their inaccuracy. One problem with these prior statistical methods is that they do not adequately model the notion of alignments between English and related semantic concepts. Without a doubt, since a NL interface to computers and databases is by definition large vocabulary, one will need an accurate statistical technique for processing NLU queries.

SUMMARY OF THE INVENTION

It is an object, therefore, to provide a statistical natural language modelling system that can, with a high degree of accuracy, model alignments between words in the English language and semantic concepts.

The invention uses statistical methods to perform natural language understanding. One key to the invention is the notion that there are "strings" of words in the natural language that correspond to a single semantic concept. One can then define an alignment between an entire semantic meaning (consisting of a set of semantic concepts), and the English. This is modeled using P(E,A|S), where E is the English sentence to be understood, A is the alignment of elements of E to elements of S, and S is the semantic meaning of the English sentence. One can model p(S) separately. This allows each parameter to be modeled using many different statistical models.

DETAILED DESCRIPTION OF THE INVENTION

Figure 1:
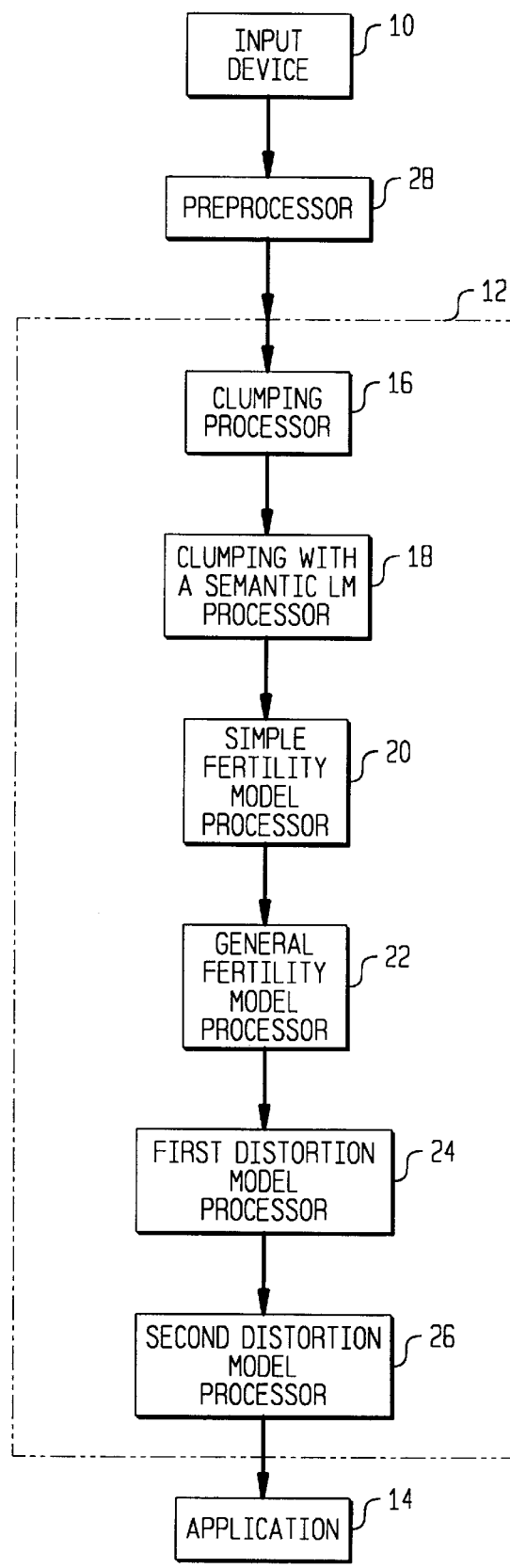
FIG. 1 is a block diagram of a system in accordance with the invention.

The system of the invention will now be described with reference to the block diagram of FIG. 1, which can be implemented as software on running on a general purpose computer. A natural language system in accordance with the present invention includes a data input unit 10, such as a keyboard or an optical character reader. The input from unit 10 is directed to a natural language processing unit 12, which includes the hierarchy of models discussed below. After natural language understanding is performed, the result can be directed to an application, such as an Air Traffic Information Service (ATIS), or displayed on a display device such as a CRT 14.

A complete natural language modelling system in accordance with the invention is a hierarchy of models, from simpler to richer. This allows bootstrapping of parameters from previous models. We first describe the models that comprise the preferred embodiment, and then some related details.

Processor 16 is a basic clumping model processor. The English sentence E is divided into a set of clumps C, each containing a substring of E. The semantic meaning is a structure S of semantic concepts, which can be unambiguously processed to generate a response to the user for input E. The semantic concepts can be unrelated (i.e., a set) or contain embedded relationships (i.e., a tree). An individual English word is denoted either e or $E_i$. An individual concept is denoted s or $S_i$. The parameters of model A are:

p(|C| | |S|)—The number of clumps in C given the size of S.

p(|c| | s)—The length of a clump aligned to concept s.

p(e|s)—The probability that s produces e in a clump.

There are no parameters to model how many clumps an s can generate, where the clumps are located in E, or how the clumps of s are related to clumps of its parents or children in S. In one embodiment of the invention, the meaning of a second sentence is produced based on probability distributions which assume that the sentence E is generated under predetermined semantic rules in non-overlapping substrings such that each substring of the sentence E is generated by one concept in a semantic library. In such a case, a set of substrings form a clumping.

Clumping-with-semantic-language-model processor 18 is similar to processor 16, but introduces a language model ("LM") on the semantic concepts to improves accuracy. This is controlled by the parameter $p(S_i|S_{i-1})$, which is the probability that clump i generated by $S_i$ can follow clump i−1 generated by $S_{i-1}$. The value $p(S_i|S_{i-1})$ can be initialized to 0 if $S_i=S_{i-1}$. to enforce the constraint that no s can generate neighboring clumps.

Processor 20 is a simple fertility model processor that models the number of clumps an s is allowed to generate. Rather than assuming that this is general (e.g. p(#C|s)) (where # stands for "number of"), this assumes that the number of clumps is a Poisson process for each S. Thus, $$p(\#C = n | S) = \frac{e^{-\lambda(s)}\lambda(s)^n}{n!}$$

While there is no theoretical basis for this, this model allows summing over all possible alignments to do either a maximum likelihood training or decoding. In addition to the poisson parameter, all the model A parameters are used in model B (except for p(|c| | s|), this is not used).

Processor 22 is a general fertility model processor that allows p(#C|s) to be an arbitrary probability distribution. We have not found a polynomial time algorithm for this yet, and hence use a simpler model (model B) to provide a list of the most probable N alignments. Each of these is then used to estimate the parameters of model C. Also, the processor 16 parameters are used.

Processor 24 is a first distortion model processor, which models the distances between clumps of s, and between the clumps of the parent of s, assuming s is represented as a tree of semantic concepts. To make computations tractable, all distances are measured relative to the left-most clump.

These distance probability distributions can be conditioned upon s, upon the height in the tree, the number of clumps, etc. The parameters that we have tried are:

p_remaining_clumps(d|s,h)—The probability that a clump of s will be placed d positions to the right of the left-most clump of s, given that node s is at height h in the tree (where h=0 represents a leaf, h=1 represents a parent of a leaf, etc). One can easily fix s and h at constants to tie all these distributions together.

p_left_or_right(s|p,h)—The probability that node s of parent p at height h will have its left-most clump to the left or right of the left-most clump of p.

p_left(d|s,p,h)—The probability that the left-most clump of s is placed d positions to the left of the left-most clump of p, when s is at height h.

p_right(d|s,p,h)—Similar to p_left, but placed to the right.

As mentioned, one can tie parameters by removing the conditioning.

Processor 26 is a second distortion model processor and is similar to processor 24, except that p_left, p_right, and p_left_or_right is replaced with p_left_son, which is allowed to be either to the left or right of the left-most clump of p.

Note: These models are intractable, so in order to train the parameters, we use a simpler model (e.g., model B) to provide candidate alignments. These are then used to estimate the parameters of these models. The training phase assumes that all possible alignments and the clumping is not known. To train the model parameters to a maximum likelihood value, an expectation maximization ("EM") algorithm is used. The parameters of the translation model are then used to predict the probability of the sentence E and a specific alignment of E to S given the semantic meaning S, $p(E,A|S)$.

It should be noted that a preprocessor 28 can optionally be used to segment the sentence into clumps. By using a preprocessor, one can accumulate parameters only over alignments consistent with this clumping. The preprocessor can also be used to identify semantically irrelevant words. The above models generate all English words from some s. But there could be words that are semantically irrelevant, and the inclusion of the parameters for these could cause a wrong answer to be selected. Thus, if we preprocess the English to identify semantically relevant words, and only generate these, we can obtain better results.

The processors in block 12 generate all English words according to p(e|s), a unigram model. One can use virtually any language model to model p(c|s), including: N-gram models; a headword model that predicts the most likely anchor point for c, and then generates the remaining words to the left and right using left n-gram models and right n-gram models; or a headword model that predicts the headword using a unigram model, and all other words using a non-headword unigram model.

One can also use a divide-and-conquer approach, in which nodes in S at the top of the semantic tree are used first to generate large substrings. These substrings are then processed recursively using the children of s.

Context dependency can be handled by including in S only the concepts that are relevant to what was said in the English. Then, if the decoder selects an s that is context dependent, a deterministic technique can be used to inherit subtrees from previous queries.

The true language model p(S), can be modeled by any statistical model desired. n-gram and maximum entropy models are preferred.

For sublanguage domains, a special decoder called a pattern matcher can be used. Rather than searching the space of all possible S to decode a new E, we instead try all S ever seen. The S that maximizes $p(E|S)p((S)$ is then output. One could then do a perturbative search from this output if desired. A language model is constructed to model the probability of the semantic meaning, p(S). This model is then used to determine arg $\max_s(p(E|S)p(S))$ for a new E. A search through the set of semantic meanings S can be made to find the one that maximizes p(E|S)p(S), wherein for the maximum likelihood decoder, p(E|S)=the sum over A of p(E,A|S), and for the viterbi decoder $p(E|S)=\max_A p(E,A|S)$.

Figure 2:
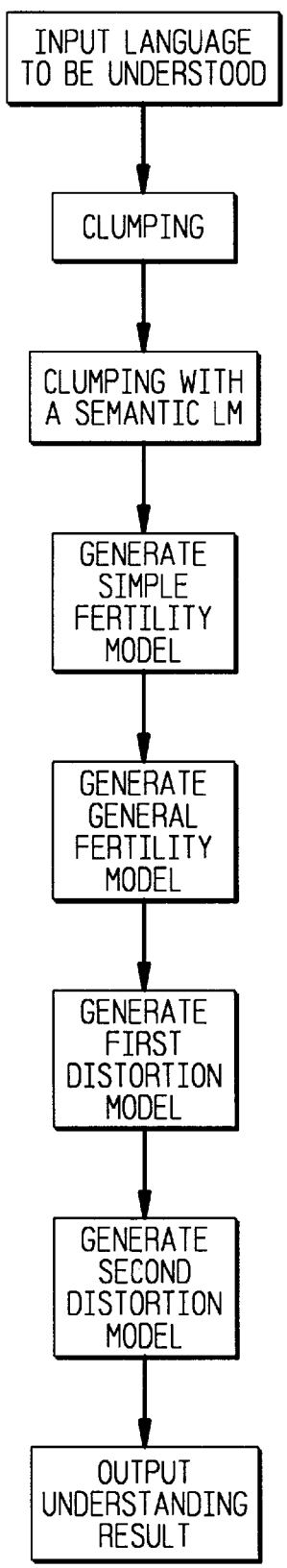
FIG. 2 is a flow chart describing the method of the present invention.

FIG. 2 shows a flow diagram of the steps of the method for carrying out the present invention.

We claim:

1. A method for performing natural language understanding, comprising:

a training phase, comprising:
providing a first sentence E of a given language;
providing the meaning S of sentence E;
generating a translation model by summing a probability of correctness over one or more possible alignments and clumpings between sentence E and meaning S, wherein the actual alignment and clumping are not known, to produce the probabilities of the translation model's parameters;
producing the probability distributions of the alignment and storing the probability distributions;

an understanding phase, comprising:
inputting a second sentence to be understood;
producing, based upon the probability distributions, the meaning of the second sentence, wherein the probability distribution assumes that the sentence E is generated under predetermined semantic rules in non-overlapping substrings such that each substring of the sentence E is generated by one concept in a semantic library, and wherein a set of substrings is called a clumping.

2. The method of claim 1, wherein the training phase assumes that all possible alignments and the clumping is not known, and wherein an expectation maximization ("EM") algorithm is used to train the model parameters to a maximum likelihood value, and wherein the parameters of the translation model are used to predict the probability of the sentence E and a specific alignment of E to S given the semantic meaning S, p(E,A|S).

3. The method of claim 2, wherein the translation model comprises a hierarchy of sub-models.

4. The method of claim 3, further comprising constructing a language model to model the probability of the semantic meaning, p(S), and using this model to determine arg $\max_s(p(E|S)p(S))$ for a new E.

5. The method of claim 4, further comprising searching through the set of semantic meanings S to find the one that maximizes p(E|S)p(S), wherein for the maximum likelihood decoder, p(E|S)=the sum over A of p(E,A|S), and for the viterbi decoder $p(E|S)=\max_A p(E,A|S)$.

6. A method for training a natural language understanding system, comprising:
providing a sentence E of a given language;
providing meanings S of the sentence E;
generating a translation model by summing a probability of correctness over one or more possible alignments and clumpings between E and S, wherein the actual alignment and clumping are not known, to produce the probabilities of the translation model's parameters, and an expectation maximization ("EM") algorithm is used to train the model parameters to a maximum likelihood value, and wherein the parameters of the translation model are used to predict the probability of the sentence E and a specific alignment of E to S given the semantic meaning S, p(E,A|S).

7. The method of claim 6, wherein the translation model comprises a hierarchy of sub-models.

8. The method of claim 6, further comprising constructing a language model to model the probability of the semantic meaning, p(S), and using this model to determine arg $\max_s(p(E|S)p(S)$ for a new E.

9. The method of claim 6, further comprising searching through the set of semantic meanings S to find the one that maximizes p(E|S)p(S), wherein for the maximum likelihood decoder, p(E|S)=the sum over A of p(E,A|S), and for the viterbi decoder p(E|S)=$\max_A$p(E,A|S).

10. A method for training a natural language understanding system, comprising:

provdiing a sentence E of a given language;

providing the meaning S of the sentence E;

generating a translation model by summing the probability of correctness over one or more possible alignments and clumpings between E and S, wherein the actual alignment and clumping are not known, to produce the probabilities of the translation model's parameters;

producing the probability distributions of the alignment and storing the probability distributions;

wherein the probability distribution assumes that the sentence E is generated under predetermined semantic rules in non-overlapping substrings such that each substring of the sentence E is generated by one concept in a semantic library, and wherein a set of substrings is called a clumping.

11. A method for performing natural language understanding, comprising:

a training phase, comprising:

providing a first sentence E of a given language;

providing the meaning S of the sentence E;

generating a translation model by summing a probability of correctness over one or more possible alignments and clumpings between E and S, wherein the actual alignment and clumping are not known, to produce the probabilities of the translation model's parameters;

producing the probability distributions of the alignment and storing the probability distributions;

wherein the probability distribution assumes that the sentence E is generated under predetermined semantic rules in non-overlapping substrings such that each substring of sentence E is generated by one concept in a semantic library, and wherein a set of substrings is called a clumping;

an understanding phase, comprising:

inputting an English sentence to be understood;

producing, based upon the probability distributions, the meaning of the English sentence.

12. A method for performing natural language understanding on an input string, comprising:

(a) inputting a string to be understood;

(b) performing a basic clumping operation on the string to identify clumps in the string;

(c) performing a clumping-with-semantic-language-model operation on the string to determine the probability of clumps generated in step (b), given context;

(d) generating a general fertility model to model a number of clumps the input string is allowed to generate;

(e) generating a distortion model to model distances between clumps of the input string;

(f) using the models generated in steps (c), (d), and (e) and, outputting an understanding result.

* * * * *